Patented Nov. 13, 1923.

1,473,853

UNITED STATES PATENT OFFICE.

WILLIAM A. HARTY, OF BUFFALO, NEW YORK, ASSIGNOR TO THE EXOLON COMPANY, OF BOSTON, MASSACHUSETTS, A CORPORATION OF MASSACHUSETTS.

REFRACTORY ARTICLE AND METHOD OF MAKING THE SAME.

No Drawing. Application filed May 13, 1921. Serial No. 469,272.

*To all whom it may concern:*

Be it known that I, WILLIAM A. HARTY, a citizen of the United States, residing at Buffalo, county of Erie, State of New York, have invented certain new and useful Improvements in Refractory Articles and Methods of Making the Same, of which the following is a specification.

My present invention relates to refractory articles of which a pre-burnt refractory commonly specified as grog is a constituent.

While my invention is of somewhat general application, it is of such particular and immediate importance in the manufacture of such refractory articles as saggers and bats used as containers or supports for ceramic ware during vitrification in the kiln, that I shall particularly discuss my invention in connection with that art as it both illustrates the general principles involved and at the same time shows an important application of those principles in a selected art. I shall therefore discuss my invention in connection with the manufacture of saggers it being understood that such specific discussion is not intended to be by way of limitation.

In the manufacture of such articles it is usual to mix from 30% to 50% of pre-burnt clay as a grog with the plastic fireclay in order to minimize the strains set up by the repeated heating and cooling of such articles in use. This burnt clay grog is usually in particles ranging in size from one-fourth inch in diameter down to fine dust. In the burning and repeated firing of such ware the difference in co-efficient of expansion between the bond clay and grog particles is so great that the adhesion between them is destroyed and the expansion and contraction develops cracks, resulting in the breaking of the article after it has been fired a comparatively few number of times. In fact, it has been quite unusual in commercial practice prior to my invention for a sagger to last more than ten fires and in many plants the average will not exceed five fires before failure when operating at the usual temperature which is approximately 1300° C.

It has been attempted to employ silicon carbide as a grog. This material because of its molecular stability and low coefficient of expansion has for many purposes proved successful. Its use, however, is not permissible in saggers used for burning white ware or porcelain as it exerts a reducing effect, resulting in a gray discoloration of the articles fired therein.

I have discovered that silica in the form of sintered or fused quartz can be used as a grog with a very great increase in the life of refractory bodies formed therefrom. Saggers made in accordance with my invention and containing the fused quartz or silica grog have been found to last forty fires or more and have the advantage of being more refractory than those containing clay grog.

As illustrative of a typical mixture for use in accordance with my invention I take sixty parts of plastic sagger clay and add to this forty parts fused quartz or silica as a grog. The clay is ground to a fine powder and the fused quartz or silica is crushed until it will pass through a one-fourth inch mesh screen. The two materials are preferably mixed first in a dry condition after which sufficient water is added to make a plastic mass which is thoroughly pugged to insure homogeneity. The refractory articles are then moulded or pressed in the customary manner and fired at a temperature of approximately 1400° C. and are then ready for use.

The above proportions are of course illustrative and the proportions and temperatures may be varied for different purposes. I prefer the silica in the form of sintered or fused quartz but any pure variety of silica that has been heated to the melting point is suitable for my process. Any such changes or modifications are to be understood as within my invention if within the scope of the appended claims.

What I therefore claim and desire to secure by Letters Patent is:

1. A refractory article containing fireclay and fused silica.

2. A refractory article formed from substantially sixty parts fire clay and substantially forty parts sintered silica.

3. A refractory article consisting of a mixture of fireclay and sintered silica.

4. A refractory article formed from substantially sixty parts refractory binder and substantially forty parts fused silica.

5. The method of making a refractory article consisting in fusing silica and in adding to the dried fused silica finely divided fireclay and intimately mixing the same, then wetting up the mixture to a plastic stage and in forming and firing the article.

6. A refractory article consisting of fireclay and fused quartz.

In testimony whereof I affix my signature in presence of two witnesses.

WILLIAM A. HARTY.

Witnesses:
 ORLO SYLVES,
 CHARLES R. FLETCHER.